United States Patent
Wong

(10) Patent No.: US 8,031,364 B2
(45) Date of Patent: Oct. 4, 2011

(54) IMAGE ADJUSTMENT CONTROL FOR IMAGE ALIGNMENT

(75) Inventor: Ellery F. Wong, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1184 days.

(21) Appl. No.: 11/800,733

(22) Filed: May 7, 2007

(65) Prior Publication Data

US 2008/0278757 A1 Nov. 13, 2008

(51) Int. Cl.
*G06F 15/00* (2006.01)
*G06F 3/12* (2006.01)

(52) U.S. Cl. ...... 358/1.9; 358/1.13; 358/1.18; 358/1.15; 358/1.2

(58) Field of Classification Search .......... 358/1.1, 358/1.9, 1.13, 1.15, 1.18, 1.11, 1.2, 518, 358/442, 451, 468; 382/289, 290, 151, 291, 382/292, 294, 286, 287, 298, 299, 293, 295, 382/296; 399/309, 372, 395, 394, 301, 72; 347/116; 101/481, 486; 715/221, 222, 223, 715/224, 225, 226, 274, 273, 243, 252

See application file for complete search history.

(56) References Cited

U.S. PATENT DOCUMENTS

| 5,666,503 | A | 9/1997 | Campanelli et al. |
| 6,715,127 | B1 | 3/2004 | Eschbach et al. |
| 7,277,669 | B2 * | 10/2007 | Howe .............................. 399/395 |
| 7,548,326 | B2 * | 6/2009 | Fukushima ................... 358/1.12 |
| 2002/0110380 | A1 * | 8/2002 | McIntyre ......................... 399/15 |
| 2004/0036847 | A1 * | 2/2004 | Conrow et al. ................. 355/24 |
| 2006/0268092 | A1 | 11/2006 | Mongeon et al. |
| 2008/0279569 | A1 * | 11/2008 | Wong .............................. 399/15 |

OTHER PUBLICATIONS

U.S. Appl. No. 11/800,748, filed May 7, 2007, Wong Method of Adjusting Print Magnification in Digital Duplex Printing.

* cited by examiner

*Primary Examiner* — Dov Popovici
(74) *Attorney, Agent, or Firm* — Fay Sharpe LLP

(57) ABSTRACT

A printing system includes a control system which processes an input print job to place it in a form for printing on a print engine. A user interface, in communication with the control system, is configured for receiving, from a user, adjustments to at least one geometric parameter for images of the print job to be applied to front and back sides of a sheet, whereby the geometric parameter is adjustable for the front and back sides independently. A print engine renders the print job on print media in accordance with received adjustments to the at least one geometric parameter.

20 Claims, 4 Drawing Sheets

IMAGE ADJUSTMENT CONTROL FOR IMAGE ALIGNMENT

CROSS REFERENCE TO RELATED PATENTS AND APPLICATIONS

The following application filed contemporaneously herewith, is incorporated herein in its entirety, by reference:

U.S. application Ser. No. 11/800,748, entitled METHOD OF ADJUSTING PRINT MAGNIFICATION IN DIGITAL DUPLEX PRINTING, by Ellery Wong.

BACKGROUND

The exemplary embodiment relates to the digital imaging arts. It finds particular application in connection with a user interface for a duplex printing system which facilitates registration of images on one or both sides of a printed sheet. However, it is to be appreciated that the exemplary user interface may have other applications.

In digital printing systems, such as laser printers, copiers, and multifunction devices, documents are frequently printed in a duplex (two sided) printing process. Typically, in a duplex process, an image is printed on a first side of a sheet of print media by applying colorants, such as toners, to the sheet. Heat and pressure are then applied, in a process known as fusing, to fix the image permanently to the sheet. Thereafter, an image is formed on the second side of the sheet and fused. Printing systems typically include controls for adjusting registration and skew for a particular print engine, to ensure that images are properly aligned on the page. However, these controls do not account for differences between one side of the sheet and the other. During the fusing of the image to the first side of the sheet, the sheet typically shrinks. As a result, the images on the front and back sides of the sheet may have different magnifications.

For a translucent print medium, such as paper, such a lack of page to page consistency is noticeable to the customer and may be perceived as a printing defect. For-example, a page number printed on the bottom-center position of the first side of a two-sided, printed document should align exactly with the page number printed on the reverse side. Additionally, when the printing system is used for overprinting, in which one image is superimposed on another, the shrinkage can lead to misregistration of the images on one side of the sheet. When the overprinting is used for adding content to a preprinted form, one side of the sheet may be correctly registered, while for the other side, there may be misregistration of the printed image with the structure of the form. When this occurs, considerable time and materials may be wasted in the course of reloading and raster image processing (ripping) of the print job in order to try to mitigate the problem. While some geometric adjustment functions exist in the video path software routines, they do not allow rapid adjustments to be made to these parameters. Print engines have hardware for making mechanical adjustments to magnification, registration, and skew, but the hardware does not compensate for fuser shrinkage, paper cut tolerances, and pre-print image characteristics, which are independent of the print engine setup itself.

INCORPORATION BY REFERENCE

The following references, the disclosures of which are incorporated herein in their entireties by reference, are mentioned:

U.S. Pat. No. 6,715,127, issued Mar. 30, 2004, entitled SYSTEM AND METHOD FOR PROVIDING EDITING CONTROLS BASED ON FEATURES OF A RASTER IMAGE, by Eschbach, et al. discloses an image editing system and method which provides a user with edit commands based on edit-related features for a raster image to be edited. The edit-related feature which is used to determine which edit commands are provided to the user can include DIR-type rendering hints, a compression ratio for the image or portion of the image, a compression scheme used to compress the image or portion of the image and other raster image features. The edit commands presented to a user can be user customized. Thus, an intelligent set of edit commands can be provided that is related to the raster image being edited.

U.S. Pat. No. 5,666,503 by Campanelli, et al., issued Sep. 9, 1997, entitled STRUCTURED IMAGE (SI) IMAGE EDITOR AND METHOD FOR EDITING STRUCTURED IMAGES, discloses an editing process and device for modifying images in the structured image format. The image editor can perform image processing operations, transparency and geometric transforms to objects.

U.S. Publication No. 20060268092, published Nov. 30, 2006, entitled SYSTEMS AND METHODS FOR REGISTERING A SUBSTRATE, by Mongeon, et al., discloses a method for reducing show through errors which may occur when the proper registration is not performed correctly. An amount of show-through error is determined by measuring the displacement between two points on the substrate, e.g., one on a first side of the sheet and one on a second side of the sheet, that are intended to be equidistant from a common sheet edge. One-half of the error value is applied as a correction value to adjust a position of the image on the substrate prior to forming the image on the substrate.

BRIEF DESCRIPTION

In accordance with one aspect of the exemplary embodiment, a printing system includes a control system which processes an input print job to place it in a form for printing on a print engine. A user interface, in communication with the control system, is configured for receiving, from a user, adjustments to at least one geometric parameter for images of the print job to be applied to front and back sides of a sheet, whereby the geometric parameter is adjustable for the front and back sides independently. A print engine renders the print job on print media in accordance with received adjustments to the at least one geometric parameter.

In accordance with another aspect, a method of printing is provided. The method includes printing test images on first and second sides of a sheet, providing for adjustments to be input for adjusting at least one geometric parameter for images to be printed subsequently on sheets based on an evaluation of at least one of the printed test images, whereby the geometric parameter for an image to be printed on at least one of the first and second sides of the sheet is adjustable independently of adjustments to the geometric parameter for an image to be printed on the other of the first and second sides of the sheet. Images are printed on sheets in accordance with the input adjustments.

In accordance with another aspect, a method of printing sheets which have a form preprinted thereon includes printing one of the preprinted sheets, the printing including applying an image to at least a first side of the sheet on which the form is preprinted. At least one geometric parameter of the applied image is evaluated. Based on the evaluation, the geometric parameter is adjusted to increase an alignment between an applied image and the preprinted form on subsequently printed sheets.

DETAILED DESCRIPTION

Aspects of the exemplary embodiment relate to a user interface for a printing system and a method of printing which facilitate the making of small adjustments to a print job to accommodate changes in geometric parameters. As a result, an operator is able to minimize alignment errors in the hard-copy output.

As used herein, a printing system can include any device for rendering an image on print media, such as a copier, laser printer, bookmaking machine, facsimile machine, or a multifunction machine. "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the printing system and may include text, graphics, pictures, and the like. The operation of applying images to print media, for example, graphics, text, photographs, etc., is generally referred to herein as printing or marking.

Geometric parameters, as used herein, are those which affect a geometric relationship between an image and the printed page on which it is located. Exemplary geometric parameters include registration, magnification, and skew. In the exemplary embodiments disclosed herein, an object of modifying the geometric parameters is to bring two images into closer alignment. These images may be on front and back sides of the sheet or on the same side, in the case of overprinting of a pre-printed sheet. Thus, while modifications may be made with respect to the page, an object is to reduce image on image misalignment.

Registration affects the distance of the image from a selected edge of the page. Registration parameters can be modified in one or both of cross process and process (typically, longitudinal and transverse) directions, resulting in a translation of the image, relative to the page. Magnification affects the size of the image relative to the page size and can be expressed in two orthogonal (e.g., longitudinal and transverse) directions. Magnification parameters can be modified in one or both of these directions so as to increase or decrease the image size relative to the page size. The modifications can be expressed as a percentage change. In general, when the image is magnified in a transverse direction, it is increased/decreased in size without changing the location of its longitudinal axis, and vice versa. Skew affects the rotation of the image relative to the page, and can be modified by angular adjustments, typically with reference to a side edge of the page, which may be positive or negative, and can be expressed in degrees or radians.

Figure 1:
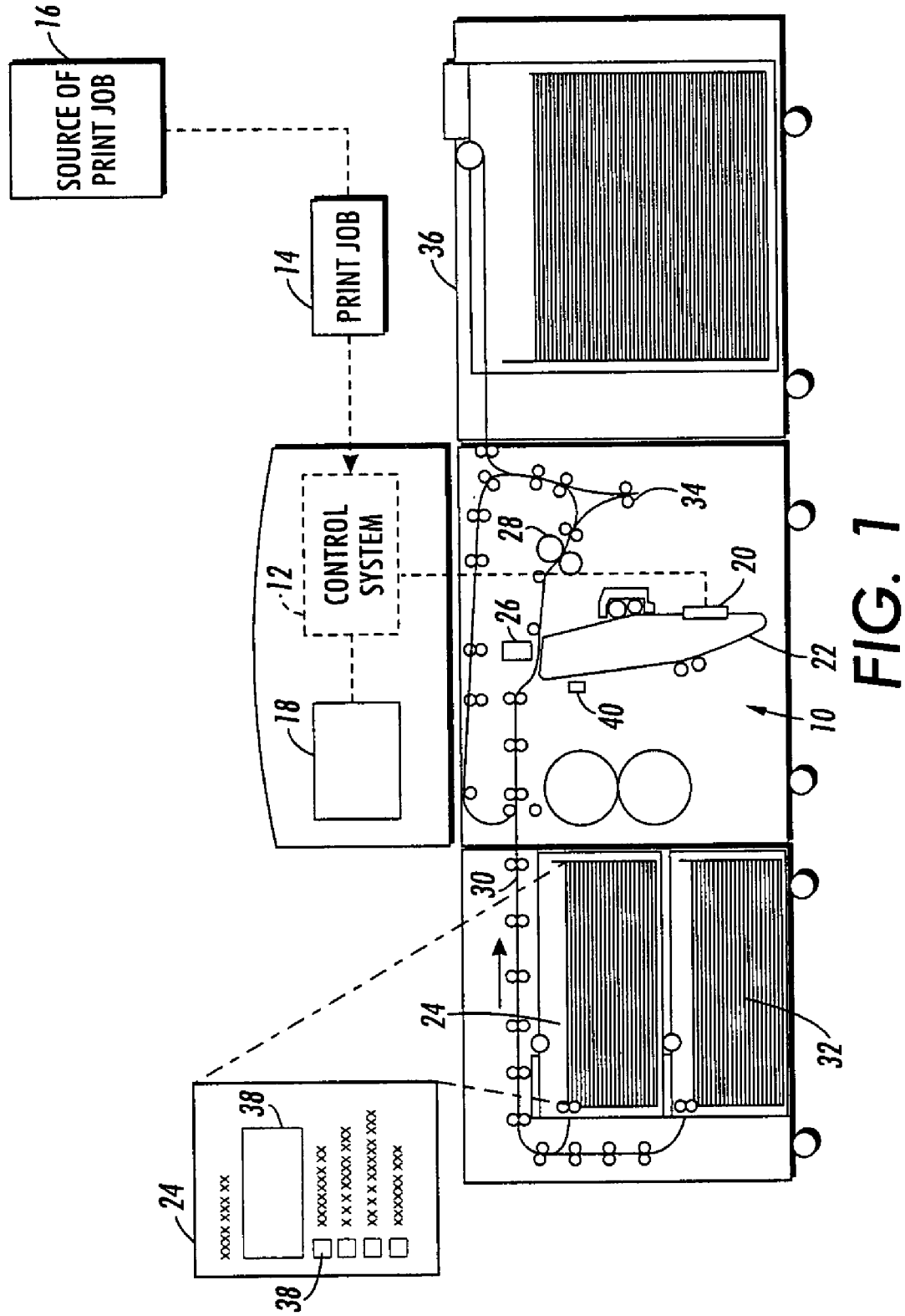
FIG. 1 is a side view of an exemplary printing system illustrating a graphical user interface in accordance with the exemplary embodiment, cut away to show a paper path through a print engine.

With reference to FIG. 1, an exemplary printing system is illustrated. The printing system includes a print engine 10, which is under the control of a control system 12, often referred to as a digital front end (DFE). A print job 14, comprising digital images to be rendered, is received by the printing system from a source 16, such as a workstation, scanning device, or data storage device, such as a CD, DVD, or memory stick. The images in the print job are processed by the control system 12 in accordance with a job ticket associated with the print job and/or stored algorithms and/or user selected parameters. The processed print job is then output to the print engine 10 in a suitable format for rendering on print media with colorants, such as inks or toners. A user interface 18, here illustrated as a graphical user interface (GUI), communicates with the control system 12 and allows a user to make small adjustments to one or more geometry parameters of the digital image, such as skew, magnification, and/or registration.

The illustrated print engine 10 is a xerographic print engine capable of duplex printing. In particular, an exposure device 20, such as a raster output scanner (ROS), creates a latent image on a charge retentive surface 22, such as the surface of a photoreceptor in the form of a belt or drum. The latent image is developed with toner to obtain a toner image, which is then transferred to a sheet 24 of print media by a transferring unit 26, such as a transfer corotron. A fuser 28 receives the printed sheet and physically attaches the toner by application of at least one of heat and pressure to the sheet. A conveyor system 30 conveys sheets of print media singly along a paper path from a sheet feeder 32 to the photoreceptor and fuser. The conveyor system 30 may be a system of baffles and associated drive members in the form of rollers or the like. Where sheets 24 are to be duplex printed, the conveyor system may return the sheet which has an image on its first side to the photoreceptor 22 for an image to be applied to the second side, generally after inverting the sheet in an inverter 34. Alternatively, the sheet may be tandem duplex printed by applying the image to the second side of the sheet in a second print engine (not shown). The printed sheets may be output to a finisher 36, here illustrated as a sheet stacker.

While particular reference is made to xerographic (electrostatographic) print engines, suitable print engines may also include ink-jet printers, including solid ink printers, thermal head printers that are used in conjunction with heat sensitive paper, and other devices capable of marking an image on a substrate.

In accordance with one aspect of the exemplary embodiment, the sheets 24 to be printed are pre-printed, e.g., with a form, on one or both sides of the sheet. In some cases, the forms may have been pre-printed by a different type of printer, such as an offset printer. Thus the print engine 10 applies images to sheets which already have image content thereon. The image to be applied to the pre-printed form is configured to match the pre-printed image. For example, the pre-printed form may have a number of fields, each with an associated space 38 for filling in information, such as a block of text, a check mark, or the like. The exemplary printing system may be used for filling in the information in the blank spaces. Accordingly, it is desirable for the image applied by the print engine to be correctly aligned with the original image content, in terms of registration, skew, and magnification, so that the information is correctly associated with the intended field.

Figure 2:
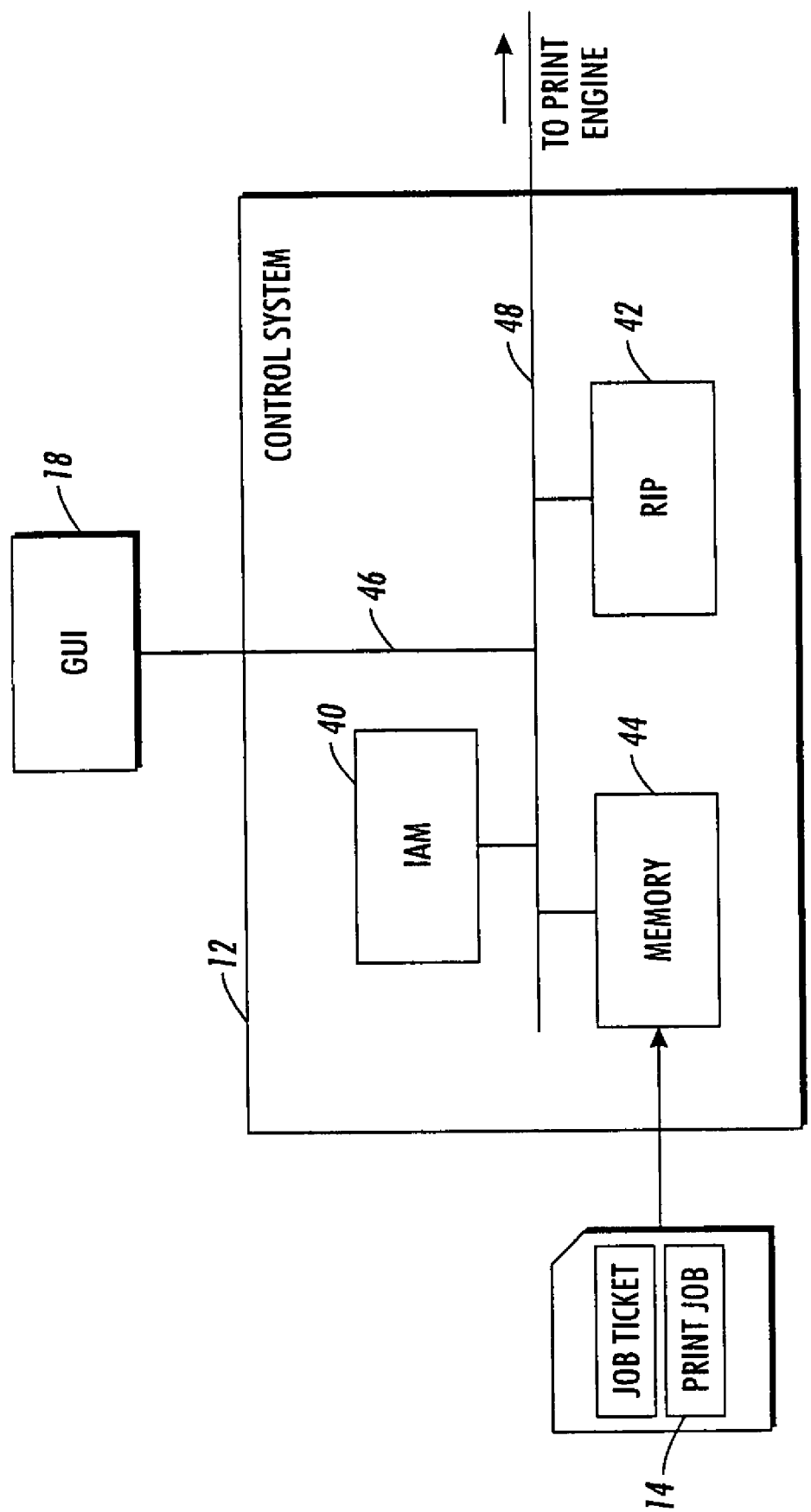
FIG. 2 is a functional block diagram of the control system of FIG. 1.

With reference now to FIG. 2, the control system 12 includes an image adjustment module (IAM) 40 for modifying print job parameters based at least in part on operator adjustments to geometric parameters of the image that are input via the GUI 18. A raster image processor (RIP) 42 processes the incoming print job, as modified by instructions provided by the image adjustment module 40, to identify image content for each page of the job, prior to the pages being sent to the ROS of the print engine for rendering. Memory 44, integral with or otherwise associated with the control system may store processing instructions to be executed by the adjustment module 40 as well as instructions for interacting with GUI 18 and for storing user selected adjustment parameters. User interface 18 is linked to the control system by a suitable wired or wireless link 46. Components of the control system may be linked by a data/control bus 48.

The IAM 40 of control system 12 is configured for adjusting parameters of the print job, based on the user selected adjustments to the geometric parameters. In particular, the IAM receives user selections input via the GUI. The AIM modifies the print job such that, when output on print media, the output print job is modified, based on the operator's selections. The images can be manipulated digitally or mechanically. The feedback from the GUI controls may be used for the image path in ripping the images prior to scheduling printing. In one embodiment, the IAM modifies a job ticket for the print job. In another embodiment, the IAM modifies image objects in the print job directly. In yet another embodiment image manipulation can be handled mechanically by offsetting specific registration setup values in the print engine for this particular print job only. In general, digital modifications are less likely to impact mechanical latitude tolerances.

Memory 44 may comprise any known type of data storage and/or transmission media, including magnetic media, optical media, random access memory (RAM), read-only memory (ROM), a data cache, a data object, etc. Moreover, memory 44 may reside in a single physical location, comprising one or more types of data storage, or be distributed across a plurality of physical systems in various forms.

The control system 12 can be implemented, at least in part, as a general purpose data processor and/or a single special purpose integrated circuit, e.g., ASIC or using a plurality of separate dedicated programmable integrated or other electronic circuits or devices, e.g., hard wired electronic or logic circuits, such as discrete element circuits or programmable logic devices. As will be appreciated, the control system 12 may include a variety of other components which are not illustrated in FIG. 2, such as a scheduling system for scheduling print jobs.

Figure 3:
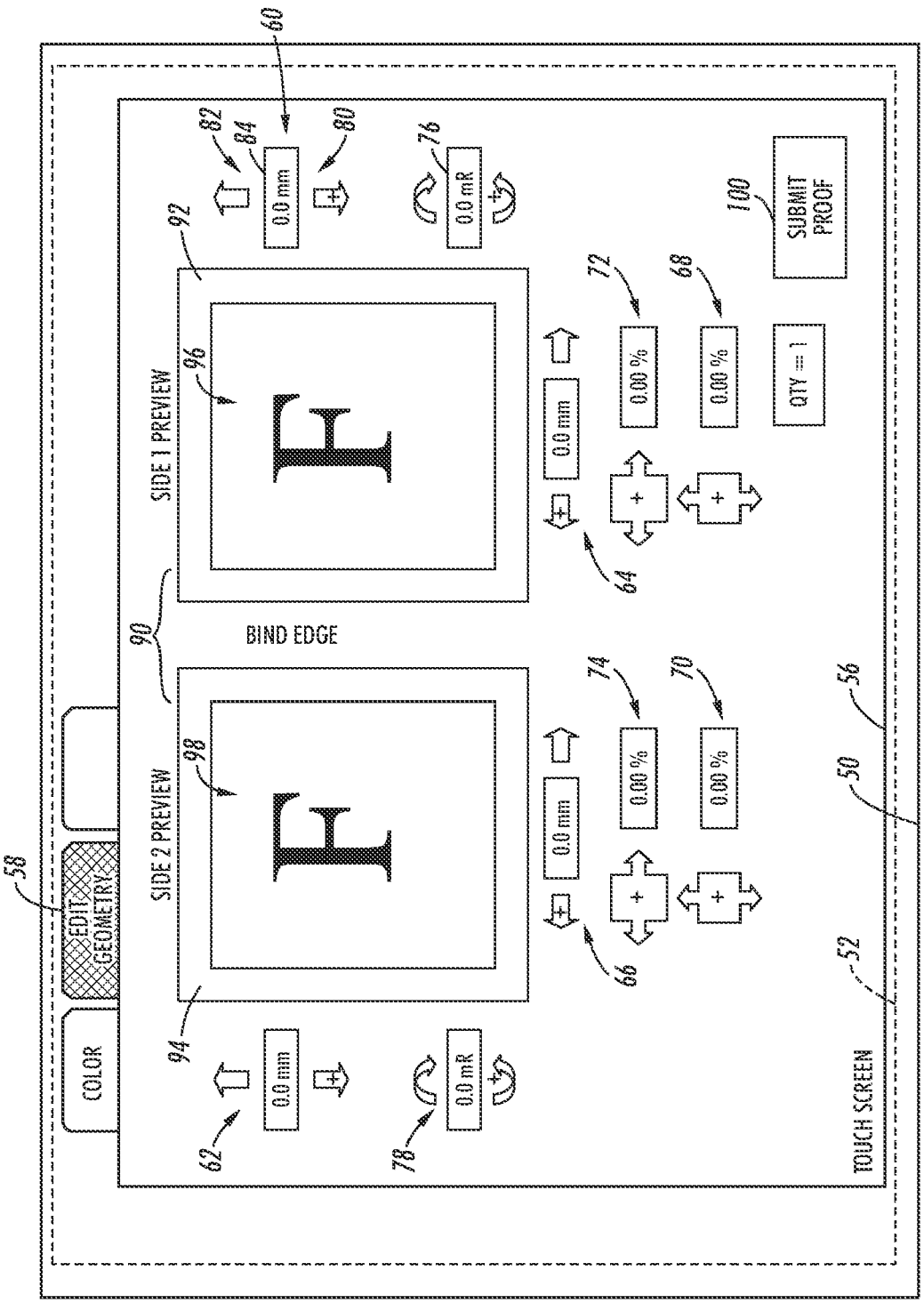
FIG. 3 is an enlarged view of the graphical user interface of FIG. 1, displaying a window for adjustment of geometric parameters for images to be rendered on the print engine.

With reference now to FIG. 3, the user interface 18 includes a visual display 50 and a user input device 52. The visual display 50 may be an LCD screen or the like which is mounted on or in close proximity to the print engine 10, as shown in FIG. 1. The illustrated user input device 52 is in the form of a touch screen, although other user input devices may additionally or alternatively be used, such as one or more of a control knob, joystick, keypad or the like.

The visual display 50 of the user interface displays a window 56, which may be selectable by a user by touching one or more selection tabs 58. The window 56 includes selectable controls 60, 62, 64, 66, 68, 70, 72, 74, 76, 78 for variably adjusting selected ones of the geometric parameters, such as registration in one or both of cross process and process directions, which affects the distance of the image from a selected edge of the sheet, magnification in one or both of these directions, which affects the size of the image in longitudinal or transverse directions, and skew, which affects the rotation of the image. In the illustrated embodiment, the controls 60, etc. are tactile controls, which are adjusted by contact with a respective area of the touch screen 52, although other user selectable controls are also contemplated. Using the controls, the geometric parameters may be adjusted for front and back sides of the sheet independently, in discrete increments (increases or decreases). The increments may be small, such as in increments of less than about 1 mm for cross process direction and process direction adjustments to registration, less than about 0.1% in the case of magnification, and less than about one milliRadian (mR) in the case of skew.

In one embodiment, the GUI 18 has touch screen control "buttons" 60, 62, 64, 66, 68, 70, 72, 74, 76, 78 for respectively adjusting the following geometric parameters for each side, independently of the other:

a) Process Direction Registration (+/−0.1 mm resolution) (controls 60, 62)

b) Cross Process Registration (+/−0.1 mm resolution) (controls 64, 66)

c) Process Magnification (+/−0.01% resolution) (controls 68, 70)

d) Cross Process Magnification (+/−0.01% resolution) (controls 72, 74)

e) Skew (+/−0.1 mR resolution) (controls 76, 78)

Thus, for example, the process direction registration of the digital image assigned to the second side of the sheet may shift in one direction by 0.1 mm each time the operator presses the first direction arrow (+) 80 of control 60, and may shift 0.1 mm in an opposite direction each time the operator presses the other direction arrow 82. The total adjustment, in mm (in the case of registration), is displayed in a display box 84 associated with the control 60, which in the illustrated embodiment is located between the two direction arrows. In other embodiments, the operator may enter adjustment values using a key pad (not shown) associated with the GUI or use direction arrows on such a keypad to effect the changes. Each of the controls 62, 64, 66, 68, 70, 72, 74, 76, 78 has adjustment inputs and a display box similar to inputs 80, 82 and display box 84.

Additionally, the window 56 displays a representation 90 which provides a preview of front and back sides 92, 94 (side 1 and side 2) of sheets, with respective images 96, 98 thereon. The sides may be arranged in book form, displaying what would be the binding edge of the pages in side by side arrangement. In one embodiment, the representation 90 remains unchanged and is simply used to denote the side to which the modifications are being made. In another embodiment, as the controls 60, 62, 64, 66, 68, 70, 72, 74, 76, 78 are adjusted, the respective image 96, 98 may be moved (e.g., translated, rotated, or magnified), with respect to the respective side 92, 94 of the sheet, to allow a user to view a representation of how the adjustments will affect the image. The representation 90 may magnify the modifications to the geometric parameters for ease of viewing. The representation 90 is not intended to provide the operator with information as to the exact locations of the images on the rendered pages, since this is dependent on a number of factors, including differences in paper cut size, fuser temperature, moisture content of the sheet prior to fusing, tendency to of the paper to shrink, fuser operating temperatures, and so forth. However, the representation may assist the operator by demonstrating the general impact of the geometric changes. For convenience, the controls associated with the side 1 and side 2 previews are displayed on the respective side of the window.

The window 56 further displays a proof control button 100, which allows an operator to selectively print a test image to allow the user to evaluate the changes made on a printed sheet. The test image may comprise a page of the print job or one or more specially designed test images. The same test image may be printed on front and back sides of a sheet or sheets or different test images may be used. The operator can thus evaluate the changes in hard copy without having to RIP the entire print job. Several iterations may be needed to reach optimum values of the geometric parameters for providing appropriate registration, magnification, and skew adjustments. In this way, images on front and back sides may be properly aligned with each other and/or an image may be aligned with original content on the same side of the sheet, such as a preprinted form. In one embodiment, the test image is a specially designed image which includes markings at regular intervals in two orthogonal directions to allow the operator to determine differences in a geometrical parameter between front and back sides of the sheet.

Figure 4:
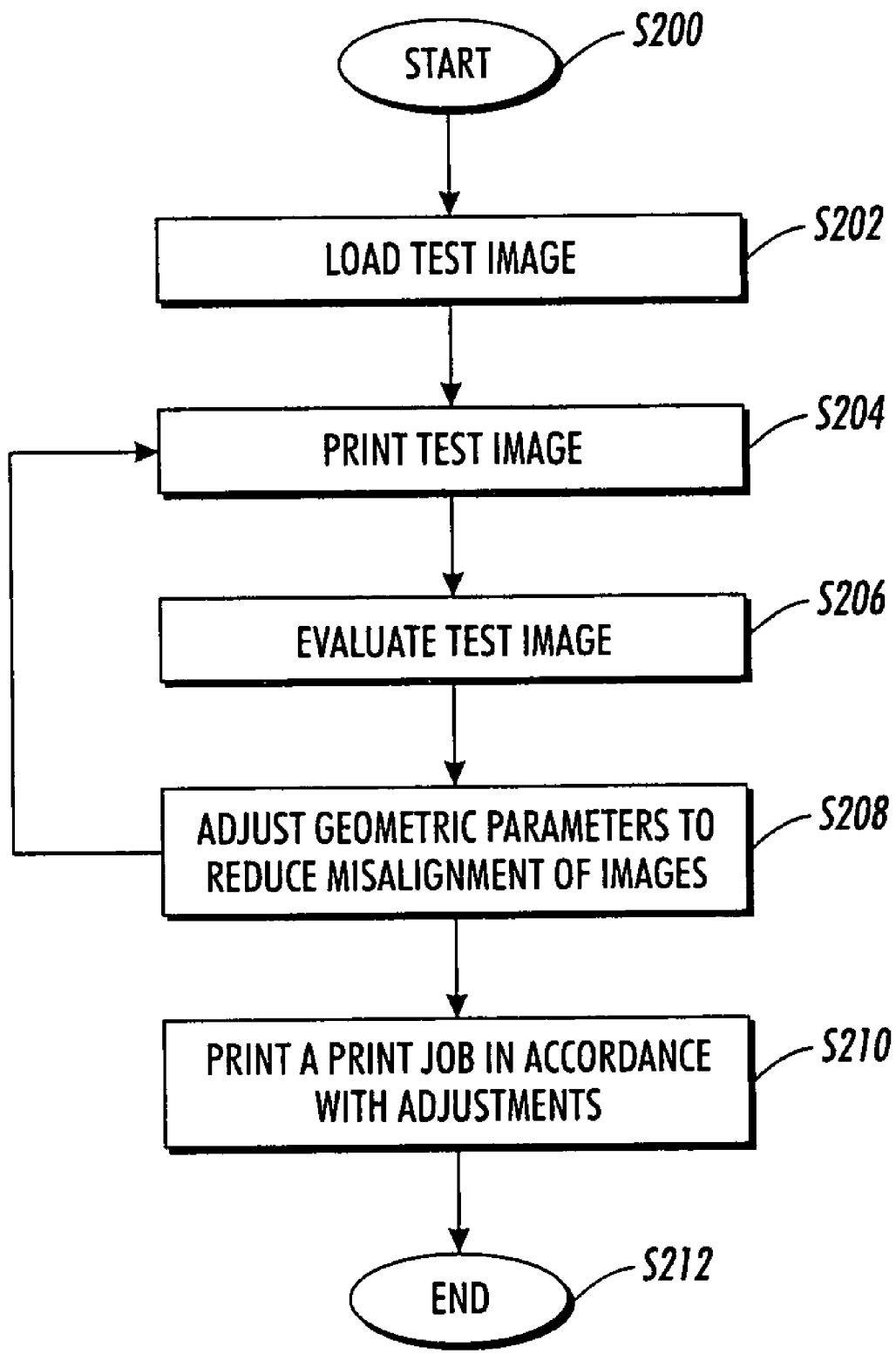
FIG. 4 is a flow diagram of a method for adjusting geometric parameters in accordance with another aspect of the exemplary embodiment.

With reference now to FIG. 4, a method for adjusting geometric parameters, which may be performed using the apparatus shown in FIGS. 1-3, is illustrated. As will be appreciated, the method may include fewer, more, or different steps than those illustrated and the steps need not proceed in the order shown. The method begins at S200.

At S202, a test image is loaded. The test image may be received as a print job in page description language (PDL) format, such as PDF. For example, the print job may be retrieved from the printer memory or sent from an external source, such as source 16. The loading may include conversion of the print job into a bitmap. At S204, the test image is sent to print engine 10 and is duplex printed on print media, such as the preprinted stock which carries a form on one or both sides which is to be used for a print job. As noted above, the test image can be a specially designed image or a page or pages of a print job to be printed. In the case of a xerographic print engine, this may include sending the test image to the ROS of the print engine and thereafter rendering it on print media by the application of toners.

At S206, an operator may examine the test image in hardcopy to evaluate whether modifications are needed to one or more geometric parameters for one or both sides of the sheet. The evaluation may include measuring distances between marks on the hardcopy to determine variations between front and back sides of the sheet. This may be performed manually, e.g., with a ruler, or with an automated device. Alternatively, the evaluation may include comparing the test image geometric parameters with those of a preprinted form or other preprinted image on the same side of the sheet. In either case, the operator may calculate the difference as a percentage, in the case of magnification or a degree in the case of skew. Or, the operator may simply determine that an adjustment to one or more of the geometric parameters is needed, without determining how much of an adjustment to apply.

At S208, if an adjustment to the geometric parameters is needed, the image edit tab 58 on the GUI 18 is selected and adjustments to one or more of the geometric parameters may be made. The user may select a specific adjustment value for the geometric parameter, or simply increment the displayed value by a positive or negative amount. Since each side of the sheet is treated independently, the operator may make adjustments only to one side of the sheet or to both sides of the sheet.

Steps S204, S206, and S208 may be repeated one or more times until the operator is satisfied with the selection of adjustments. For example, if only a registration error is detected, the operator may adjust the registration by 0.1 mm, reprint the test print and determine whether there has been an improvement in the registration, either between front and back sides, or between a printed image on one side and the original content (e.g., a preprinted form) on the same side of the sheet. For example, magnification errors are first corrected, by adjustment and printing of one or more proofs. Then any registration errors are corrected, and finally any skew errors. In each case, an adjustment may be made, followed by printing of a proof on the print engine 10.

At S210, the print job may be printed on the same print engine 10 (or tandem duplex printed on the same two print engines) based on the adjustments. Adjustments to the geometric parameter for the first side of the sheet, if any, are applied to all first sides in the print job. Adjustments to the geometric parameter for the second side of the sheet, if any, are applied to all second sides in the print job. In particular, the values input by the operator in the window 56 at the final iteration may be used to update information defined in the job ticket associated with the print job prior to ripping. In other embodiments, mechanical adjustments may be made to the print engine.

The method ends at S212.

As will be appreciated, the exemplary method may proceed prior to or during a print job. In one embodiment, the operator may run one or more pages with test images prior to beginning a print job and make adjustments to the geometric parameters for the job, if needed. In other embodiments, the operator may notice misalignments in the output hardcopies when some of the pages of the print job have already been ripped and sent to the print engine. At this stage, the operator may stop the print job, or allow it to continue to run. The operator may run one or more test prints for which adjustments to the geometric parameters are made, and re-rip the remaining pages of the print job with the adjusted geometric parameters. In cases where the print jobs are large files, this reduces the delays in printing the job. For printing systems which schedule printing of pages about 12-25 images ahead the changes may be scheduled to be implemented at the next un-ripped page. Pages of the print job printed without the modifications may be re-printed once the job is complete.

In one embodiment, the adjustments may be performed at least partially automatically. For example, a closed loop feature may be provided if substrate sizing input is available to measure the sizing errors due to paper cut tolerances and fuser shrinkage prior to imaging. Depending on the processing time, this may allow correction per sheet or per set of sheets being run at that time.

The computer implemented steps of the method illustrated in FIG. 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary embodiment provides a user-friendly tool which allows several geometric parameters to be adjusted in small increments. This allows variations, such as ream to ream variations in cut size, position of an image relative to a pre-printed image, and paper shrinkage properties, to be rapidly accommodated. These variations cannot be readily controlled or accommodated by conventional mechanical methods for registration adjustment. The customer is provided with a way to adjust for these variables, reducing service calls, and giving the customer more control.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
   a control system which processes an input print job to place it in a form for printing on a print engine;
   a user interface, in communication with the control system, which is configured for receiving, from a user, adjustments to at least one geometric parameter for images of the print job to be applied to front and back sides of a sheet, whereby the geometric parameter is adjustable for the front and back sides independently, the user interface being configured for displaying a representation of a front side and a back side of a page which represents the adjustments to the at least one geometric parameter of the images thereon; and
   a print engine which renders the print job on print media in accordance with received adjustments to the at least one geometric parameter.

2. The printing system of claim 1, wherein the at least one geometric parameter comprises at least one of a registration parameter, a magnification parameter, and a skew parameter.

3. The printing system of claim 2, wherein the user interface is configured for receiving adjustments to a registration parameter, a magnification parameter, and a skew parameter.

4. The printing system of claim 2, wherein the user interface is configured for receiving adjustments to the registration parameter in increments of less than 1 mm.

5. The printing system of claim 2, wherein the user interface is configured for receiving adjustments to the magnification parameter in increments of less than 1%.

6. The printing system of claim 2, wherein the user interface is configured for receiving adjustments to the skew parameter in increments of less than 1 mR.

7. The printing system of claim 1, wherein the user interface comprises a graphical user interface.

8. The printing system of claim 7, wherein the user interface displays at least one user adjustable control for receiving incremental adjustments to a respective one of a plurality of adjustable geometric parameters.

9. The printing system of claim 1, wherein the control system is configured for modifying a job ticket for the print job in accordance with the adjustments.

10. The printing system of claim 1, wherein the control system is configured for printing a test image on front and back sides of a sheet for proofing the adjustments.

11. The printing system of claim 10, wherein the user interface displays a proofing button which causes the control system to print the test image on front and back sides of the sheet.

12. The printing system of claim 1, wherein the at least one geometric parameter comprises a plurality of geometric parameters and wherein the user interface is configured for displaying a window including the representation of a front side and a back side of a page together with representations of selectable controls for variably adjusting selected ones of the geometric parameters of the images represented on the representation of the front side and the back side of the page.

13. A method of printing comprising:
   printing test images on first and second sides of a sheet;
   providing for adjustments to be input to at least one geometric parameter for images to be printed subsequently on sheets based on an evaluation of at least one of the printed test images, whereby the geometric parameter for an image to be printed on at least one of the first and second sides of the sheet is adjustable independently of adjustments to the geometric parameter for an image to be printed on the other of the first and second sides of the sheet;
   displaying a representation of a front side and a back side of a page which represents the adjustments to the at least one geometric parameter of images thereon; and
   printing images on sheets in accordance with the input adjustments.

14. The method of claim 13, wherein the printing of test images includes printing images on a preprinted sheet.

15. The method of claim 14, wherein the evaluation includes evaluating geometrical parameters of the at least one of the printed test images and a preprinted image on the same side of the sheet.

16. The method of claim 14, wherein the preprinted sheet comprises a form.

17. The method of claim 13, wherein the input of adjustments includes receiving adjustments from a user on a user interface.

18. The method of claim 13, further comprising, rendering a print job in accordance with the adjustments.

19. A method of printing sheets which have a form preprinted thereon comprising:
   printing one of the preprinted sheets, the printing including applying an image to at least a first side of the one of the preprinted sheets on which the form is preprinted;
   evaluating at least one geometric parameter of the applied image;
   based on the evaluation, adjusting the geometric parameter to increase an alignment between an applied image and the preprinted form on subsequently printed sheets; and
   displaying a representation of a front side and a back side of a page which represents adjustments to geometric parameters of images thereon and displaying selectable controls for variably adjusting selected ones of the geometric parameters of the images.

20. The method of claim 19, wherein the printing includes duplex printing the sheet and wherein the geometric parameter for the first side and a second side is independently adjustable.

* * * * *